(12) United States Patent
Pabari et al.

(10) Patent No.: US 8,342,188 B2
(45) Date of Patent: Jan. 1, 2013

(54) COMB

(76) Inventors: Alpa Shantilal Pabari, Essex (GB);
Hiten Shantilal Pabari, Essex (GB)

( * ) Notice: Subject to any disclaimer, the term of this patent is extended or adjusted under 35 U.S.C. 154(b) by 261 days.

(21) Appl. No.: 12/373,674

(22) PCT Filed: Jul. 5, 2007

(86) PCT No.: PCT/GB2007/002508
§ 371 (c)(1),
(2), (4) Date: Jun. 8, 2009

(87) PCT Pub. No.: WO2008/007055
PCT Pub. Date: Jan. 17, 2008

(65) Prior Publication Data
US 2010/0000559 A1 Jan. 7, 2010

(30) Foreign Application Priority Data
Jul. 14, 2006 (GB) .................................. 0614049.5

(51) Int. Cl.
*A45D 24/04* (2006.01)
(52) U.S. Cl. ....................................... 132/142; 132/126
(58) Field of Classification Search .................. 132/142,
132/212, 213, 213.1, 219, 107, 121, 126,
132/139, 141, 148, 149, 150, 159, 161, 137,
132/136, 129, 152, 154, 155, 901; 119/611,
119/612, 613, 617, 619, 625, 626, 630; 15/167.1,
15/167.3, 236.08; 401/28, 279, 286; D4/136;
D28/21, 28, 33, 22, 25, 30
See application file for complete search history.

(56) References Cited

U.S. PATENT DOCUMENTS

| 997 | A | * | 11/1838 | Sanford | 119/625 |
| 397,926 | A | * | 2/1889 | McPherson | 119/613 |
| 930,678 | A | | 8/1909 | Moore | |
| 1,347,260 | A | * | 7/1920 | Desmarais | 132/139 |
| 1,436,776 | A | * | 11/1922 | Nach | 132/114 |
| 1,471,527 | A | * | 10/1923 | Proctor | 132/137 |
| 1,582,151 | A | * | 4/1926 | Wolkow | 132/124 |

(Continued)

FOREIGN PATENT DOCUMENTS
FR 2677234 A1 12/1992
(Continued)

OTHER PUBLICATIONS

Chinese Office Action of Application No. 200780032799.0, 6 pgs, dated Jun. 22, 2010.

(Continued)

*Primary Examiner* — Vanitha Elgart
(74) *Attorney, Agent, or Firm* — Edwards Wildman Palmer LLP

(57) ABSTRACT

A comb (100) includes a spine (4) and, extending from the spine in adjacent, substantially parallel planes, a first outer row of teeth (31), a central row of teeth (33) and a second outer row of teeth (32) opposed to the first outer row of teeth. The teeth (10) of the first and second outer rows of teeth and of the central row of teeth are substantially a same length. Spacing of the teeth of the central row (33) is different from spacing of the teeth of the first and second outer rows (31, 32) with the spacing of the teeth being arranged for the removal of head lice and/or nits and/or head lice eggs and/or fleas from combed hair or fur.

13 Claims, 4 Drawing Sheets

U.S. PATENT DOCUMENTS

| | | | | |
|---|---|---|---|---|
| 1,624,753 A * | 4/1927 | De Dios Moreno | | 132/139 |
| 2,205,200 A * | 6/1940 | Huppert | | 132/161 |
| 2,238,603 A * | 4/1941 | Runnels | | 132/120 |
| D132,367 S * | 5/1942 | Imamura | | D28/29 |
| 2,626,618 A * | 1/1953 | Collison | | 132/136 |
| 2,633,591 A * | 4/1953 | Servilla | | 15/160 |
| 2,678,047 A * | 5/1954 | Garfield | | 132/219 |
| 3,133,546 A | 5/1964 | Dent | | |
| 3,216,428 A * | 11/1965 | Hallnan | | 132/136 |
| 4,008,726 A * | 2/1977 | DiGiuseppe | | 132/136 |
| 4,287,898 A * | 9/1981 | Konesky | | 132/142 |
| 4,475,563 A * | 10/1984 | Martin | | 132/136 |
| 4,612,944 A * | 9/1986 | Bachrach et al. | | 132/159 |
| 4,807,652 A * | 2/1989 | Bachrach | | 132/137 |
| 4,928,716 A * | 5/1990 | Greene | | 132/212 |
| 4,993,438 A * | 2/1991 | Hunt | | 132/139 |
| 5,301,695 A * | 4/1994 | Wong | | 132/108 |
| 5,636,646 A * | 6/1997 | Zito | | 132/149 |
| 5,884,633 A * | 3/1999 | Ford | | 132/137 |
| 5,937,868 A * | 8/1999 | Ogunro | | 132/213.1 |
| 6,006,758 A * | 12/1999 | Thorne | | 132/139 |
| 6,098,633 A * | 8/2000 | Pabari | | 132/142 |
| D459,027 S * | 6/2002 | Chen et al. | | D28/22 |
| 7,234,472 B2 * | 6/2007 | Ramet | | 132/139 |
| 7,389,779 B2 * | 6/2008 | Chan | | 132/136 |
| 7,650,893 B2 * | 1/2010 | De Laforcade | | 132/218 |
| 2004/0250831 A1 * | 12/2004 | Rizzuto | | 132/271 |
| 2006/0076030 A1 | 4/2006 | De Laforcade | | |
| 2008/0110471 A1 * | 5/2008 | Oliver et al. | | 132/148 |
| 2010/0089412 A1 * | 4/2010 | Brownfield | | 132/121 |
| 2010/0300469 A1 * | 12/2010 | Bachrach et al. | | 132/107 |
| 2011/0048439 A1 * | 3/2011 | Young | | 132/126 |

FOREIGN PATENT DOCUMENTS

| | | |
|---|---|---|
| FR | 2681228 A1 | 3/1993 |
| GB | 2294200 A | 4/1996 |
| GB | 2342291 A | 4/2000 |
| GB | 2342291 A | 12/2000 |

OTHER PUBLICATIONS

International Search Report dated Oct. 22, 2007 for corresponding PCT Application No. PCT/GB2007/002508, 2 pages.

* cited by examiner

COMB

BACKGROUND OF THE INVENTION

1. Field of the Invention

This invention relates to a comb and particularly to a comb for removing lice, nits and/or lice eggs from human hair or for removing lice, nits and/or lice eggs or fleas from animal hair or fur.

2. Description of Related Art

Fine toothed hair combs are well known. However, known fine toothed combs, which may be used for smoothing and straightening hair to a desired extent, suffer from a disadvantage that they cannot readily be passed through the hair, particularly if the hair is tangled. It is therefore also well known to provide a comb with a single row of teeth in two portions, a second portion having teeth which are more finely spaced than the first portion. Hair may then be first coarsely combed with the portion having more coarsely spaced teeth and then more finely combed with the portion having more finely spaced teeth.

Such an arrangement is not practical for a finely spaced teeth comb for the removal of lice, nits—i.e. empty egg shells, lice eggs, fleas and similar parasites because such a comb has preferably to be passed through the hair in contact with the human scalp or body of an animal along the whole length of the comb. Because of the curvature of the scalp or body, this restricts the length of a straight comb. Although, in principle, a nit comb of twice the normal length could be used first with one portion with more widely spaced teeth, and then with the another portion with more closely spaced teeth, this is inconvenient, and there is no guarantee that the comb would be properly used by an inexperienced user. For example, such a user may seek to use the full length of the comb in each pass through the hair, and thereby not keep the whole length of the comb in contact with the scalp or body, and smaller parasites would also pass between the more widely spaced teeth.

A hair comb having two rows of teeth is known from GB-539653-A in which a first row of teeth in coarsely spaced and a second row of teeth is finely spaced so that the first row of teeth coarsely combs the hair before the relatively finely spaced teeth comb the hair. The two rows of teeth of the disclosure are preferably formed with a convex curvature to provide a smoothing action on the hair. Teeth of one of the rows are shorter than the teeth of the other row. This facilitates the use of the comb at an acute angle to the scalp. The teeth are tapering and a preferred spacing of a first row of teeth is an integer multiple of the spacing of the second row of teeth, so that teeth on the finely spaced row may be aligned with spaces between teeth of the more coarsely spaced row of teeth. It is asserted that with this comb the hair can be coarsely combed with the coarsely spaced teeth and finely combed with the finely combed teeth in one motion through the hair.

Such a comb as disclosed in GB-539653-A has a number of disadvantages for the removal of head lice, nits and eggs and fleas. The presence of rows of teeth of different lengths means that the comb cannot effectively be used substantially perpendicular to the scalp, which is the preferred orientation for the removal of head lice, nits, eggs and fleas. Moreover, the tapering shape of the teeth means that there is a tapering space between the teeth, so that a uniform barrier is not presented to the head lice, nits and eggs and fleas. Thus, objects of a given size may be trapped in a narrow portion of the tapering space but pass through a wider portion of the tapering space between teeth. The restriction of the spacing of one row of teeth being an integer multiple of the spacing of the second row of teeth also means that the spacings may not be optimised for the entrapment of large lice and fleas and also smaller lice, nits and eggs and fleas.

There is also known from GB 2342291 a hair comb with a handle and two rows of teeth, the teeth of the first row of teeth being of substantially the same length as the teeth of the second row of teeth, wherein the spacing of the teeth is arranged for the removal of head lice and/or nits and/or head lice eggs from combed hair. The handle has an advantage of permitting the comb to be more firmly grasped than a handleless comb. Although this comb is useful in removing head lice, nits and head lice eggs it has a disadvantage that it is preferably only passed through the hair in one direction, with the more widely spaced row of teeth leading. Unlike some known nit combs without an extending handle, the comb cannot be readily reversed and still grasped by the handle. This is not particularly disadvantage when, for example, a parent is combing a child's hair, but for a user combing their own hair both a left-handed comb and a right-handed comb are ideally required. Similarly, when combing a pet's or other animal's hair it would be preferable to be able to use a same comb in either direction.

It is an object of the present invention to provide a comb suitable for the removal of head lice, nits and head lice eggs or fleas which at least partially overcomes at least some of the above problems in the prior art.

BRIEF SUMMARY OF THE INVENTION

According to this invention, there is provided a comb including a spine and, extending from the spine in adjacent, substantially parallel planes, a first outer row of teeth, a central row of teeth and a second outer row of teeth opposed to the first outer row of teeth, the teeth of the first and second outer rows of teeth and of the central row of teeth being of substantially a same length, wherein the spacing of the teeth of the central row is different from the spacing of the teeth of the first and second outer rows and the spacing of the teeth is arranged for the removal of head lice and/or nits and/or head lice eggs and/or fleas from combed hair or fur, such that the comb may be used in a left or right hand.

Conveniently, the teeth of the central row of teeth are more closely spaced than the teeth of at least the first outer row of teeth.

Preferably, the teeth in at least one of the rows of teeth have a substantially circular cross section.

Advantageously, the teeth in at least one of the rows of teeth have rounded tips remote from the spine.

Preferably, the teeth in at least one of the rows of teeth are of metal.

Preferably, the rows of teeth extend in a direction substantially orthogonal to a major axis of the spine.

Conveniently, the central row of teeth has at least 20% more teeth per unit length than at least the first outer row of teeth.

Advantageously, the teeth of at least the first outer row are spaced at 8 to 10 teeth per centimeter and the teeth of the central row are spaced at 10 to 12 teeth per centimeter.

Conveniently, the teeth of at least the first outer row are spaced at 10 teeth per centimeter and the teeth of the central row are spaced at 12 teeth per centimeter.

Advantageously, the spacing between the teeth of the first outer row is approximately 0.36 mm and the spacing between the teeth of the central row is 0.15 mm to 0.20 mm.

Preferably, the diameter of each tooth is approximately 0.65 mm to 0.75 mm.

Advantageously, terminal teeth at ends of at least one of the rows have a larger diameter than other teeth in the at least one of the rows.

Conveniently, the terminal teeth have a diameter of 1.0 mm to 1.1 mm.

Alternatively, teeth of the central or inner row are more widely spaced than teeth in at least the first outer row.

Preferably, handle means is attached to the spine.

Advantageously, the handle means is integrally formed with the spine and provided with grip means for assisting a user to grip the handle means.

BRIEF DESCRIPTION OF THE SEVERAL VIEWS OF THE DRAWINGS

The invention will now be described by way of example with reference to the accompanying drawings in which.

In the figures like reference numerals denote like parts.

DETAILED DESCRIPTION OF THE INVENTION

Figure 1:
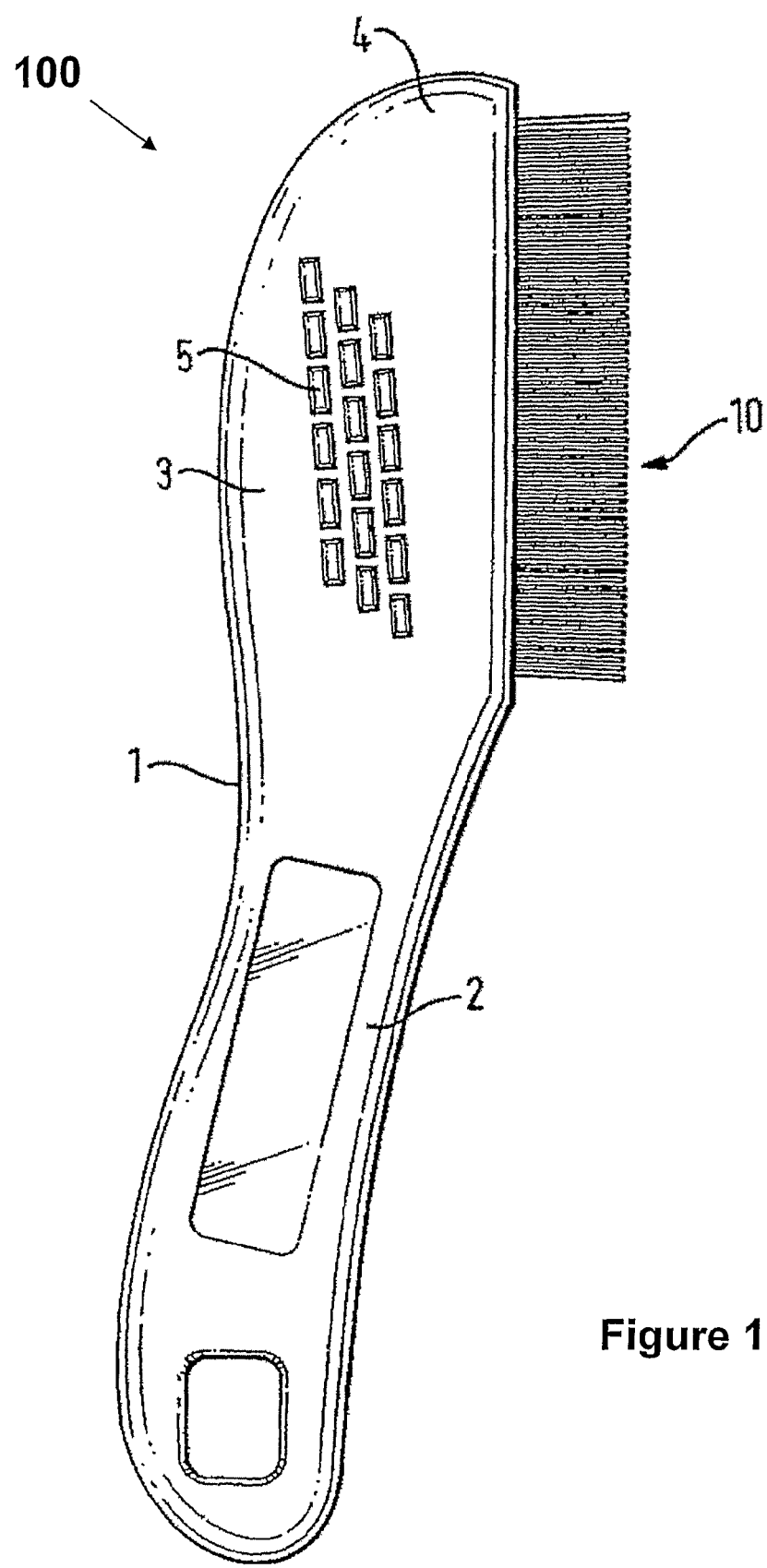
FIG. 1 shows a side view of a comb in accordance with this invention.
Figure 2:
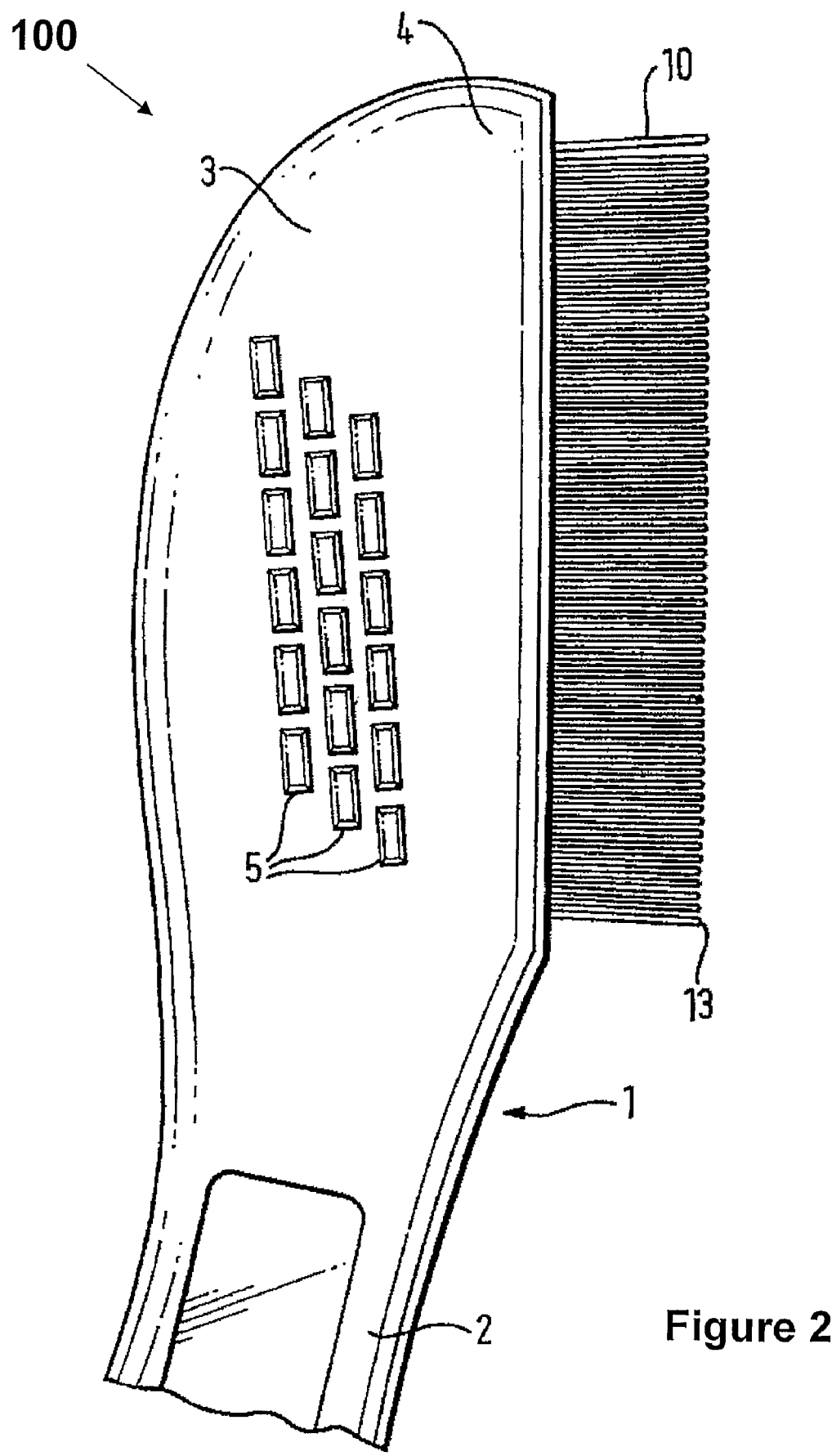
FIG. 2 shows an enlarged side view of a portion of the comb of FIG. 1.

Referring to FIGS. 1 and 2, a comb 100 according to the invention has a handle 1 formed of an arcuate portion 2 for location in a palm of a hand of a user and a finger grip portion 3, a right hand side (as shown in FIG. 1) portion of the comb forms a spine 4 for securing three rows of teeth 10 in substantially parallel planes. The finger grip portion 3 includes three parallel spaced rows each of six raised stud portions 5 to assist grip on the handle 1 by the user.

Figure 3:
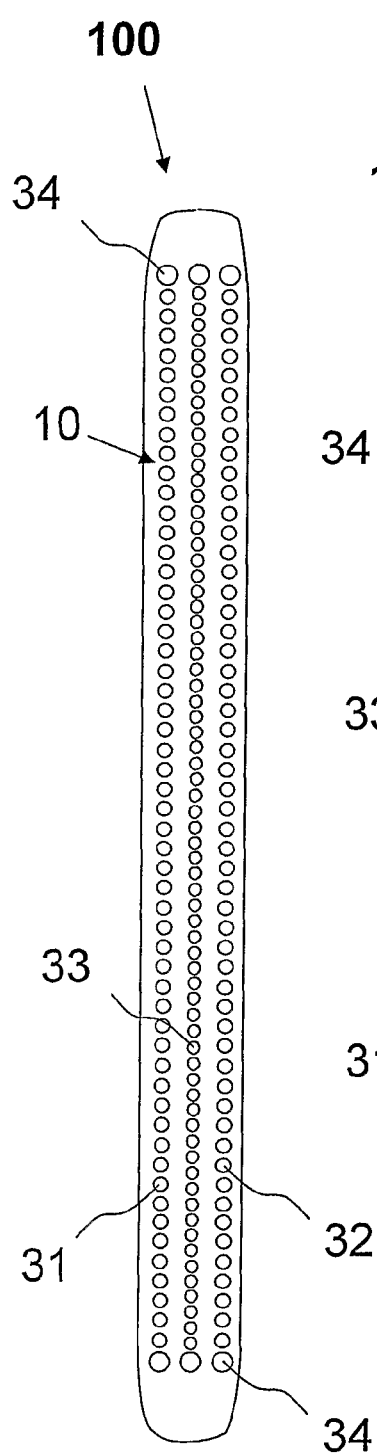
FIGS. 3 and 5 show underside views of the teeth of the comb shown in FIGS. 1 and 2.
Figure 4:
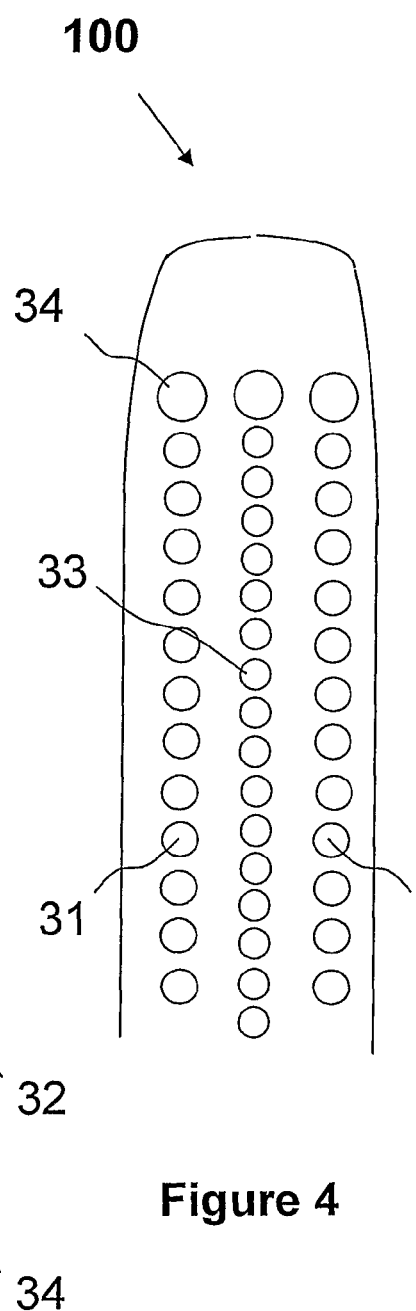
FIG. 4 shows an enlarged portion of the underside view of FIG. 3.
Figure 5:
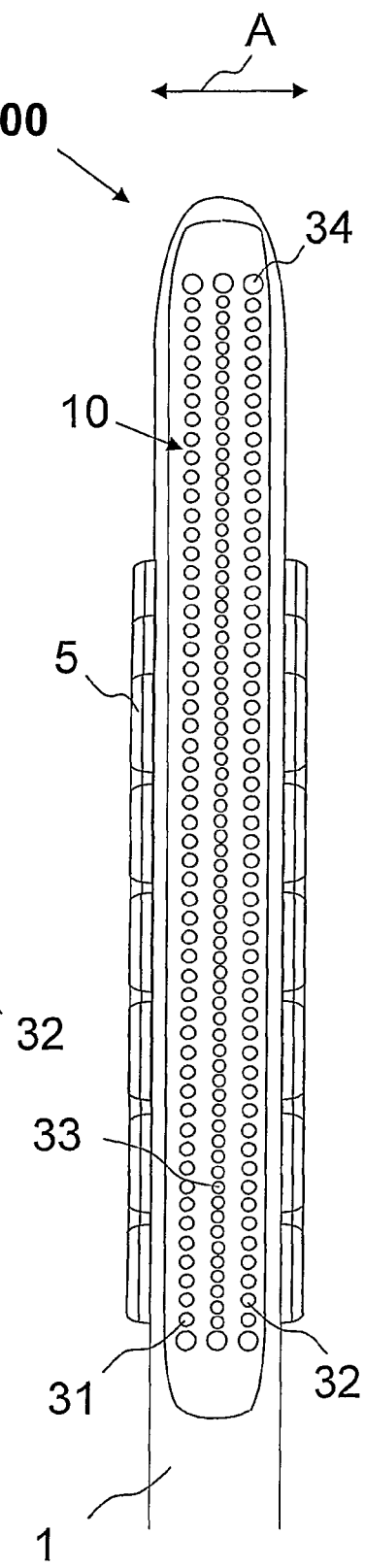

Referring to FIGS. 3 to 5, the teeth 10 are arranged in three parallel rows in which neighbouring teeth are spaced such that a first outer row 31 and second outer row 32 of teeth are more widely spaced than a central, or inner, row 33 of teeth. The teeth 10 have a substantially circular transverse cross-section and, as shown in FIG. 2, ends of the teeth remote from the spine have rounded tips 13. The three rows of teeth 31, 32 and 33 also have substantially a same length as one another in a direction extending orthogonally from the spine and are preferably made of metal. The central row of teeth 33 may have at least 20% more teeth per unit length than the outer rows of teeth 31, 32. For removing lice, nits and lice eggs, the outer rows of teeth 31, 32 may be spaced at 8-10 teeth per centimeter, preferably 10 teeth per centimeter, and the teeth of the inner row 33 may be spaced 10-12 teeth per centimeter, preferably 12 teeth per centimeter. Wider spacings may be used for removing fleas and other parasites larger than lice.

For lice, nits and lice egg removal the spacing between the teeth of the outer rows in a currently preferred embodiment is 0.36 mm and the spacing between the teeth of the inner row is preferably 0.15 mm to 0.20 mm.

For flea removal the spacing between the teeth of the outer rows in a currently preferred embodiment is 0.36 mm and the spacing between the teeth of the inner row is preferably 0.18 mm to 0.20 mm.

Also, in a currently preferred embodiment, the diameter of each tooth of both the inner and outer rows of teeth is approximately 0.65 mm-0.75 mm but in another embodiment, the outer rows of teeth, i.e. the more widely spaced rows, have a larger diameter than the inner row of teeth.

As best seen in FIGS. 3, 4 and 5, terminal teeth 34 at the ends of the rows are preferably of larger diameter than other teeth in the rows. These larger diameter teeth tend to protect the smaller diameter teeth from physical damage in storage, transit and in use.

In use, the hair comb may be moved in either direction of double-headed arrow-headed line A shown in FIG. 5. Because more widely spaced teeth are in the outer rows the more widely spaced row of teeth move through the hair first performing a first coarse combing for larger head lice, nits and eggs, or, for example, fleas, with the central row of teeth forming a more fine filtering of smaller head lice, nits and eggs or, for example, fleas. The wider spaced outer rows may also tend to untangle the hair or fur to some extent before being combed by the finely spaced inner row.

Figure 6:
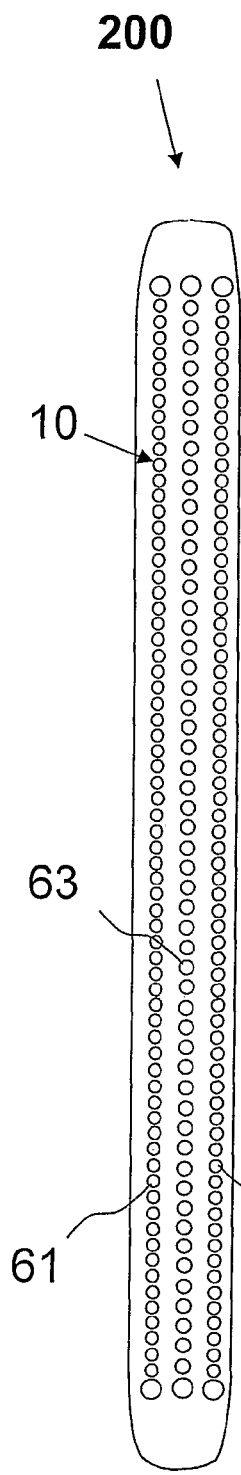
FIGS. 6 and 8 show underside views of the teeth of a second embodiment of a comb in accordance with the invention.
Figure 7:
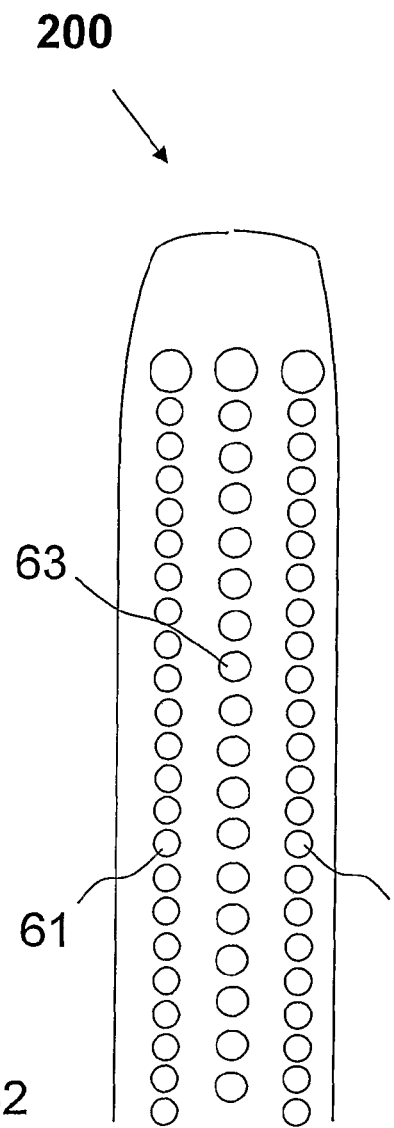
FIG. 7 shows an enlarged portion of the underside view of FIG. 6.
Figure 8:
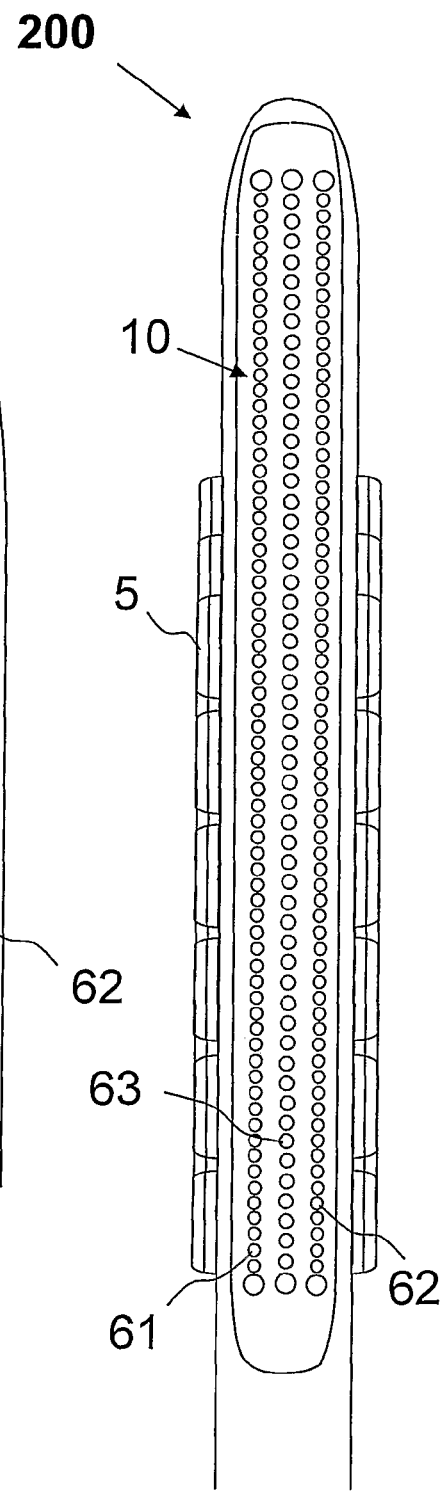

In another embodiment of a comb 200 according to the invention, underside views of the teeth portion of which are shown in FIGS. 6 to 8, the central rows 63 of teeth are more widely spaced than the outer rows 61, 62. Otherwise the second embodiment 200 is similar to the first embodiment 100, apart from the spacings and dimensions of the inner and outer rows of teeth being reversed.

Although embodiments have been described in which the two outer rows have a same spacing of teeth and a same cross-sectional diameter, it will be understood that the outer rows may have different spacings and/or cross-sectional diameters from each other. Where a first outer row is more widely spaced than a second, opposed outer row, the comb may be used first with the widely spaced outer-row leading and subsequently with the less widely spaced outer row leading, for example, as the hair or fur becomes less tangled.

The invention claimed is:

1. A comb, comprising:
    a spine;
    a first outer row of teeth, a single central row of teeth and a second outer row of teeth wherein each row of teeth is affixed to and extends from the spine in adjacent, substantially parallel planes in a fixed relation to one another, the single central row of teeth extends along and is positioned between the first and second outer rows of teeth, the teeth of the first and second outer rows of teeth and of the single central row of teeth being of substantially a same length and each tooth having a substantially circular cross section and each tooth extending away from the spine without tapering, the cross sections of the first and second outer rows of teeth have a diameter greater than the cross sections of the teeth of the single central row of teeth, the spacing of the teeth of the central row are more closely spaced together than the spacing of the teeth of at least the first outer row of teeth for the removal of head lice and/or nits and/or head lice eggs and/or fleas from combed hair or fur, such that the comb may be used in a left or right hand.

2. A comb as claimed in claim 1, wherein the teeth in at least one of the rows of teeth have rounded tips remote from the spine.

3. A comb as claimed in claim 1, wherein the teeth in at least one of the rows of the teeth are of metal.

4. A comb as claimed in claim 1, wherein the rows of teeth extend in a direction substantially orthogonal to a major axis of the spine.

5. A comb as claimed in claim 1, wherein the central row of teeth has at least 20% more teeth per unit length than at least the first outer row of teeth.

6. A comb as claimed in claim 5, wherein the teeth of at least the first outer row are spaced at 8 to 10 teeth per centimeter and the teeth of the central row are spaced at 10 to 12 teeth per centimeter.

7. A comb as claimed in claim 6, wherein the teeth of at least the first outer row are spaced at 10 teeth per centimeter and the teeth of the central row are spaced at 12 teeth per centimeter.

8. A comb as claimed in claim 1, wherein the spacing between the teeth of the first outer row is approximately 0.36 mm and the spacing between the teeth of the central row is 0.15 mm to 0.20 mm.

9. A comb as claimed in claim 1, wherein the diameter of each tooth within the first and second outer rows of teeth is approximately 0.65 mm to 0.75 mm.

10. A comb as claimed in claim 1, wherein terminal teeth at ends of at least one of the rows have a larger diameter than other teeth in at least one of the rows.

11. A comb as claimed in claim 10, wherein the terminal teeth have a diameter of 1.0 mm to 1.1 mm.

12. A comb as claimed in claim 1, wherein a handle is attached to the spine.

13. A comb as claimed in claim 12, wherein the handle is integrally formed with the spine and provided with a grip portion for assisting a user to grip the handle.

* * * * *